United States Patent
Takeda et al.

(10) Patent No.: US 12,058,690 B2
(45) Date of Patent: *Aug. 6, 2024

(54) DOWNLINK CONTROL INFORMATION SIZE CONFIGURATION FOR MULTIPLE CARRIER SCHEDULING SCENARIOS

(71) Applicant: QUALCOMM Incorporated, San Diego, CA (US)

(72) Inventors: Kazuki Takeda, Tokyo (JP); Alberto Rico Alvarino, San Diego, CA (US); Le Liu, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 244 days.

This patent is subject to a terminal disclaimer.

(21) Appl. No.: 17/443,926

(22) Filed: Jul. 28, 2021

(65) Prior Publication Data

US 2022/0039141 A1 Feb. 3, 2022

Related U.S. Application Data

(60) Provisional application No. 63/058,946, filed on Jul. 30, 2020.

(51) Int. Cl.
*H04W 72/23* (2023.01)

(52) U.S. Cl.
CPC .................................. *H04W 72/23* (2023.01)

(58) Field of Classification Search
CPC H04W 72/23; H04W 74/0808; H04L 5/0053; H04L 5/001
See application file for complete search history.

(56) References Cited

U.S. PATENT DOCUMENTS

| | | | | |
|---|---|---|---|---|
| 2017/0311322 A1* | 10/2017 | Kim | .................... | H04L 25/0224 |
| 2019/0124627 A1* | 4/2019 | Park | ..................... | H04L 5/0053 |
| 2019/0357238 A1* | 11/2019 | Zhou | .................... | H04W 72/23 |
| 2021/0153228 A1* | 5/2021 | Shi | ...................... | H04W 72/569 |

OTHER PUBLICATIONS

International Search Report and Written Opinion—PCT/US2021/071057—ISA/EPO—Nov. 29, 2021.

(Continued)

*Primary Examiner* — Charles C Jiang
*Assistant Examiner* — Rachel Elizabeth Marks
(74) *Attorney, Agent, or Firm* — Harrity & Harrity, LLP

(57) ABSTRACT

Various aspects of the present disclosure generally relate to wireless communication. In some aspects, a user equipment (UE) may determine, for a plurality of carriers in a cross-carrier scheduling scenario, whether a quantity of downlink control information (DCI) sizes for a set of DCIs that the UE monitors satisfies a threshold, wherein the threshold is a per scheduling cell per scheduled cell threshold or a per scheduled cell threshold. The UE may selectively perform a DCI size alignment procedure to adjust a DCI size configuration based at least in part on whether the quantity of DCI sizes satisfies the threshold. The UE may monitor for the set of DCIs based at least in part on the DCI size configuration. Numerous other aspects are provided.

30 Claims, 11 Drawing Sheets

| | Step 305 | Step 310 | Step 315 | Step 320 |
|---|---|---|---|---|
| CSS DCI 0_0 | Size A | | | |
| CSS DCI 1_0 | Size A | | | |
| USS DCI 0_0 | | Size B | | |
| USS DCI 1_0 | | Size B | | |
| USS DCI 0_1 | | | Size C (+1 bit if aligned with size B) | |
| USS DCI 1_1 | | | Size D (+1 bit if aligned with size B) | |
| USS DCI 0_2 | | | | Size E |
| USS DCI 1_2 | | | | Size F |

300

(56) References Cited

OTHER PUBLICATIONS

NOKIA: et al., "Feature Lead Summary #3 on Cross-Carrier Scheduling with Different Numerologies", 3GPP Draft, 3GPP TSG RAN WG1 Meeting #97, R1-1907855, 7.2.13.2 Summary #3, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 17, 2019 (May 17, 2019), XP051740128, 18 pages, Retrieved from the Internet: URL: http://www.3gpp.org/ftp/tsg%5Fran/WG1%5FRL1/TSGR1%5F97/Docs/R1%2D1907855%2Ezip. [retrieved on May 17, 2019] section 2.4; p. 7-p. 8.

Qualcomm Incorporated: "Discussion on DCI Related Issues", 3GPP Draft, 3GPP TSG RAN WG1 Meeting #92bis, R1-1804800 DCI. 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 15, 2018 (Apr. 15, 2018), XP051427067, 8 Pages, Retrieved from the Internet: URL: http://www.3gpp.org/ftp/Meetings%5F3GPP%5FSYNC/RAN1/Docs/. [Retrieved on Apr. 15, 2018], Sections 1-5.

QUALCOMM: "Remaining Issues on PDCCH Enhancements for URLLC", 3GPP Draft, 3GPP TSG RAN WG1 #100 eMeeting, R1-2000968, 3rd Generation Partnership Project (3GPP), Mobile Competence Centre, 650, Route Des Lucioles, F-06921 Sophia-Antipolis Cedex, France, vol. RAN WG1, No. eMeeting, Feb. 24, 2020-Mar. 6, 2020, Feb. 15, 2020 (Feb. 15, 2020), XP051853542, 11 Pages, Retrieved from the Internet: URL: https://ftp.3gpp.org/tsg_ran/WG1_RL1/TSGR1_100_e/Docs/R1-2000968.zip. [Retrieved on Feb. 15, 2020], sections 1-7.

* cited by examiner

| | Step 305 | Step 310 | Step 315 | Step 320 |
|---|---|---|---|---|
| CSS DCI 0_0 | Size A | | | |
| CSS DCI 1_0 | Size A | | | |
| USS DCI 0_0 | | Size B | | |
| USS DCI 1_0 | | Size B | | |
| USS DCI 0_1 | | | Size C (+1 bit if aligned with size B) | |
| USS DCI 1_1 | | | Size D (+1 bit if aligned with size B) | |
| USS DCI 0_2 | | | | Size E |
| USS DCI 1_2 | | | | Size F |

FIG. 3A

| | Step 325 | Step 330 | Step 335 | Step 340 |
|---|---|---|---|---|
| CSS DCI 0_0 | Check if no more than 4 sizes and no more than 3 sizes with C-RNTI? | Size A | Size A | Size A |
| CSS DCI 1_0 | | Size A | Size A | Size A |
| USS DCI 0_0 | | Size B => Size A | Size A | Size A |
| USS DCI 1_0 | | Size B => Size A | Size A | Size A |
| USS DCI 0_1 | | Size C (remove the +1 bit) | Size C | Size C => Size C/D |
| USS DCI 1_1 | | Size D (remove the +1 bit) | Size D | Size D => Size C/D |
| USS DCI 0_2 | | Size E | Size E => Size E/F | Size E |
| USS DCI 1_2 | | Size F | Size F => Size E/F | Size F |

FIG. 3B

| Table 1 | Scheduled cell 1 | Scheduled cell 2 |
|---|---|---|
| 0_0/1_0 | 40 | |
| 0_2/1_2 | 60 | 70 |
| 0_1/1_1 | 80 ⇒ 95 | 90 |
| GC-PDCCH | 32 | 36 |
| Multi-CC DCI | 95 | |

| Table 2 | Scheduled cell 1 | Scheduled cell 2 |
|---|---|---|
| 0_0/1_0 | 40 | |
| 0_2/1_2 | 60 | 70 |
| 0_1/1_1 | 80 | 90 |
| GC-PDCCH | 32 | 36 |
| Multi-CC DCI | 75 ⇒ 80 | |

FIG. 6A

DOWNLINK CONTROL INFORMATION SIZE CONFIGURATION FOR MULTIPLE CARRIER SCHEDULING SCENARIOS

CROSS-REFERENCE TO RELATED APPLICATION

This patent application claims priority to U.S. Provisional Patent Application No. 63/058,946, filed on Jul. 30, 2020, entitled "DOWNLINK CONTROL INFORMATION SIZE CONFIGURATION FOR MULTIPLE COMPONENT CARRIER SCHEDULING SCENARIOS," and assigned to the assignee hereof. The disclosure of the prior Application is considered part of and is incorporated by reference into this patent Application.

FIELD OF THE DISCLOSURE

Aspects of the present disclosure generally relate to wireless communication and to techniques and apparatuses for downlink control information size configuration for multiple carrier scheduling scenarios.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: determining, for a plurality of carriers in a cross-carrier scheduling scenario, whether a quantity of downlink control information (DCI) sizes for a set of DCIs that the UE monitors satisfies a threshold, wherein the threshold is a per scheduling cell per scheduled cell threshold or a per scheduled cell threshold; selectively performing a DCI size alignment procedure to adjust a DCI size configuration based at least in part on whether the quantity of DCI sizes satisfies the threshold; and monitoring for the set of DCIs based at least in part on the DCI size configuration.

In some aspects, a UE for wireless communication includes a memory and one or more processors coupled to the memory, the memory and the one or more processors configured to: determine, for a plurality of carriers in a cross-carrier scheduling scenario, whether a quantity of DCI sizes for a set of DCIs that the UE monitors satisfies a threshold, wherein the threshold is a per scheduling cell per scheduled cell threshold or a per scheduled cell threshold; selectively perform a DCI size alignment procedure to adjust a DCI size configuration based at least in part on whether the quantity of DCI sizes satisfies the threshold; and monitor for the set of DCIs based at least in part on the DCI size configuration.

In some aspects, a non-transitory computer-readable medium storing a set of instructions for wireless communication includes one or more instructions that, when executed by one or more processors of a UE, cause the UE to: determine, for a plurality of carriers in a cross-carrier scheduling scenario, whether a quantity of DCI sizes for a set of DCIs that the UE monitors satisfies a threshold, wherein the threshold is a per scheduling cell per scheduled cell threshold or a per scheduled cell threshold; selectively perform a DCI size alignment procedure to adjust a DCI size configuration based at least in part on whether the quantity of DCI sizes satisfies the threshold; and monitor for the set of DCIs based at least in part on the DCI size configuration.

In some aspects, an apparatus for wireless communication includes: means for determining, for a plurality of carriers in a cross-carrier scheduling scenario, whether a quantity of DCI sizes for a set of DCIs that the apparatus monitors satisfies a threshold, wherein the threshold is a per scheduling cell per scheduled cell threshold or a per scheduled cell threshold; means for selectively performing a DCI size alignment procedure to adjust a DCI size configuration based at least in part on whether the quantity of DCI sizes satisfies the threshold; and means for monitoring for the set of DCIs based at least in part on the DCI size configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A and 3B are diagrams illustrating an example of downlink control information (DCI) size alignment, in accordance with the present disclosure.

FIGS. 6A and 6B are diagrams illustrating examples associated with DCI size configuration for multiple carrier scheduling scenarios, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
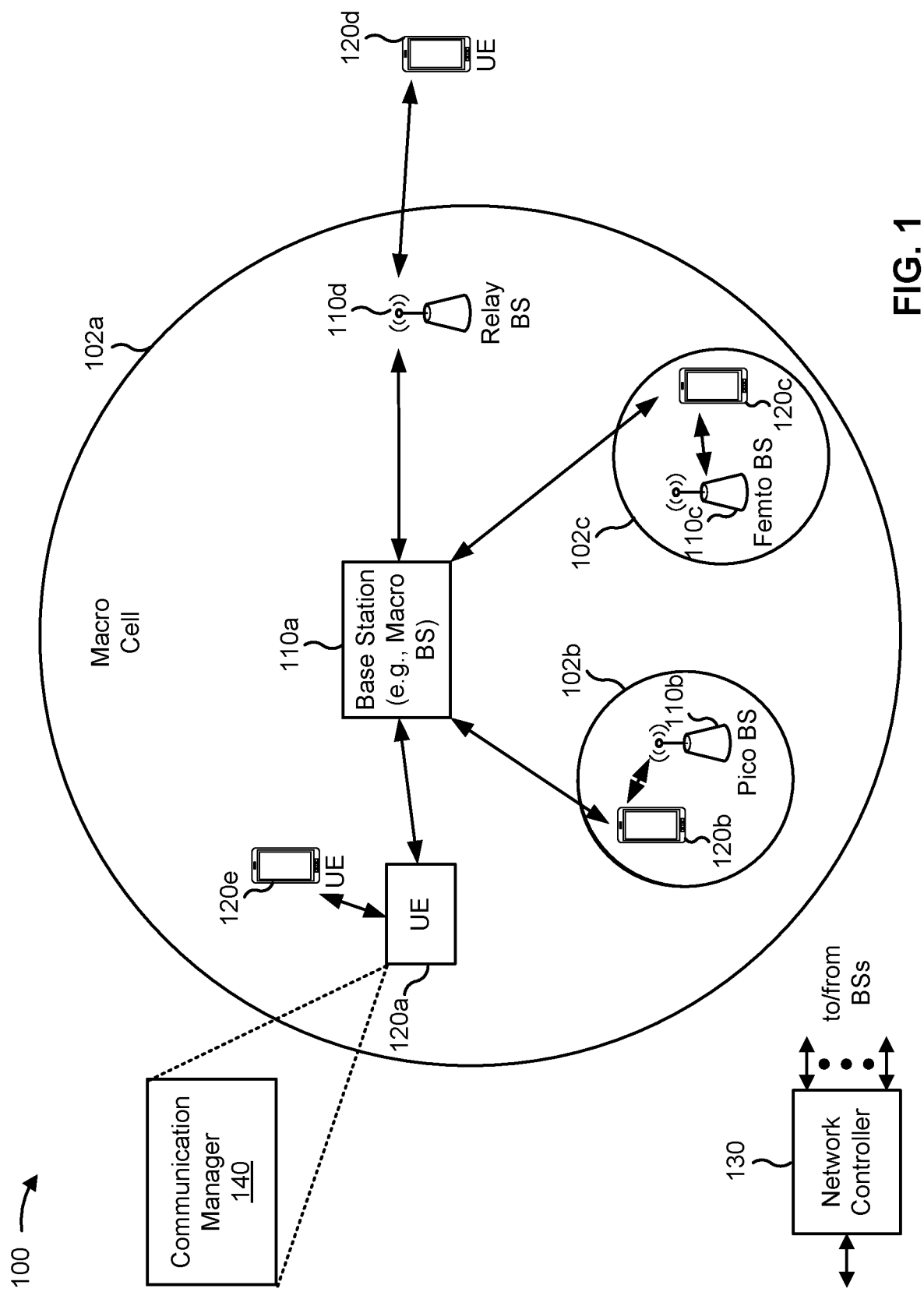
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may determine, for a plurality of carriers in a cross-carrier scheduling scenario, whether a quantity of DCI sizes for a set of DCIs, that the UE monitors, satisfies a threshold, selectively perform a DCI size alignment procedure to adjust a DCI size configuration based at least in part on whether the quantity of DCI sizes satisfies the threshold, or monitor for the set of DCIs based at least in part on the DCI size configuration, among other examples. Additionally, or alternatively, the communication manager 140 may perform one or more other operations described herein.

As indicated above, FIG. 1 is provided as an example. Other examples may differ from what is described with regard to FIG. 1.

Figure 2:
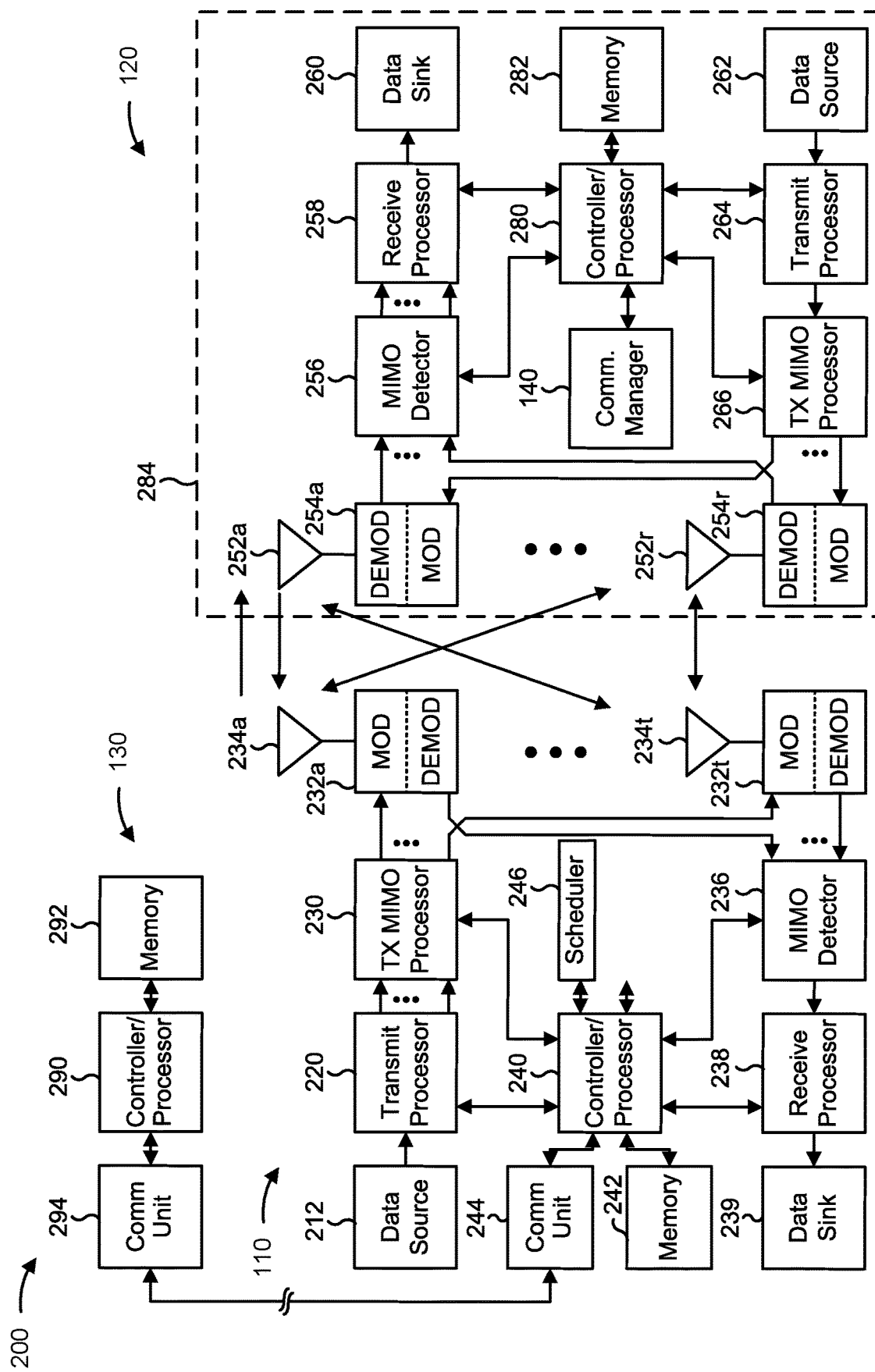
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5A-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5A-8).

The controller/processor 240 of the base station 110, the controller/processor 280 of the UE 120, and/or any other component(s) of FIG. 2 may perform one or more techniques associated with downlink control information (DCI) size configuration for multiple carrier scheduling scenarios, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7 and/or other processes as described herein. In some examples, executing instructions may include running the instructions, converting the instructions, compiling the instructions, and/or interpreting the instructions, among other examples.

In some aspects, a UE (e.g., the UE 120) includes means for determining, for a plurality of carriers in a cross-carrier scheduling scenario, whether a quantity of DCI sizes for a set of DCIs, that the UE monitors, satisfies a threshold, means for selectively performing a DCI size alignment procedure to adjust a DCI size configuration based at least in part on whether the quantity of DCI sizes satisfies the threshold, or means for monitoring for the set of DCIs based at least in part on the DCI size configuration, among other examples. In some aspects, such means may include one or more components of UE 120 described in connection with FIG. 2, such as controller/processor 280, transmit processor 264, TX MIMO processor 266, antenna 252, modem 254, MIMO detector 256, receive processor 258, or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIGS. 3A and 3B are diagrams illustrating an example 300 of DCI size alignment, in accordance with the present disclosure.

As shown in FIG. 3A, and by step 305, a UE may determine a first size, Size A, for a common search space (CSS) DCI 0_0 and for a CSS DCI 1_0 (if CSS DCI 0_0 or CSS DCI 1_0 are configured, respectively). In some cases, the UE may align the CSS DCI 0_0 to a size of the CSS DCI 1_0. For example, when the CSS DCI 0_0 has a larger size than the CSS DCI 1_0, the UE may add a set of zero padding bits to the CSS DCI 0_0 until the payload size is equal to that of the DCI 10. In contrast, if the CSS DCI 00 has a smaller size than the CSS DCI 10 prior to truncation, the UE may reduce the bitwidth of the frequency domain resource assignment (FDRA) field in the DCI 0_0 by truncating the first few most significant bits such that the size of DCI 0_0 equals to the size of the DCI 1_0.

As further shown in FIG. 3A, and by step 310, the UE may determine a second size, Size B, for a UE-specific search space (USS) DCI 0_0 and a USS DCI 1_0 (if USS DCI 0_0 or USS DCI 1_0 are configured, respectively). In some cases, the UE may align the USS DCI 0_0 and the USS DCI 1_0 to a common size by adding padding bits to a smaller one of the USS DCI 0_0 and the USS DCI 1_0.

As further shown in FIG. 3A, and by step 315, the UE may determine a third size, Size C, for a USS DCI 0_1 and a fourth size, Size D, for a USS DCI 1_1 (if USS DCI 0_1 or USS DCI 1_1 are configured, respectively). In some cases, the UE may determine Size C and/or Size D based at least in part on Size B. For example, the UE may set Size C and/or Size D as one bit greater than Size B.

As further shown in FIG. 3A, and by step 320, the UE may determine a fifth size, Size E, for a USS DCI 0_2 and a sixth size, Size F, for a USS DCI 1_2 (if USS DCI 0_2 or USS DCI 1_2 are configured, respectively).

As shown in FIG. 3B, and by step 325, the UE may determine whether a size threshold is satisfied. For example, based at least in part on which DCIs are configured for the UE, the UE may determine a quantity of DCI sizes. In other words, if CSS DCI 0_0 (Size A), CSS DCI 1_0 (Size A), USS DCI 0_1 (Size C), and USS DCI 0_2 (Size E) are configured, then there are three DCI sizes. In contrast, if CSS DCI 0_0 (Size A), USS DCI 0_0 (Size B), USS DCI 0_1 (Size C), and USS DCI 0_2 (Size E) are configured, then there are four DCI sizes. Based at least in part on determining the quantity of DCI sizes, the UE may determine whether there are more than 4 DCI sizes or more than 3 DCI sizes with a cell-specific radio network temporary identifier (C-RNTI) configured. If neither DCI size threshold is satisfied, then the UE may proceed without performing further steps of DCI size alignment. However, if either DCI size threshold is satisfied, then the UE may perform further steps of DCI size alignment, as described herein with regard to FIG. 3B and steps 330-340.

As further shown in FIG. 3B, and by step 330, the UE may perform a first set of size alignment actions. For example, the UE may maintain CSS DCI 0_0 and CSS DCI 1_0 (if configured) at Size A; the UE may align USS DCI 0_0 and/or USS DCI 1_0 (if configured) to Size A (e.g., using padding bits or truncating existing bits); the UE may remove the added bit in USS DCI 0_1 and USS DCI 1_1 (if configured) that was added with regard to step 315, and the UE may maintain a size of USS DCI 0_2 and USS DCI 1_2 (if configured).

As further shown in FIG. 3B, and by step 335, the UE may perform a second set of alignment actions. For example, the UE may maintain CSS DCI 0_0, CSS DCI 1_0, USS DCI 0_0, USS DCI 1_0, USS DCI 0_1, and USS DCI 1_1 (if configured); and may align USS DCI 0_2 with USS DCI 1_2 (if configured) by adding padding bits to one or the other to cause USS DCI 0_2 and USS DCI 1_2 to have a common size (e.g., Size E or Size F).

As further shown in FIG. 3B, and by step 340, the UE may perform a third set of alignment actions. For example, the UE may maintain CSS DCI 0_0, CSS DCI 1_0, USS DCI 0_0, USS DCI 1_0, USS DCI 0_2, and USS DCI 1_2 (if configured); and may align USS DCI 0_1 with USS DCI 1_1 (if configured) by adding padding bits to one or the other to cause USS DCI 0_1 and USS DCI 1_1 to have a common size (e.g., Size C or Size D). In some cases, the UE may repeat the check of step 325 after each of steps 330, 335, and 340. In other cases, the UE may perform a multiple of steps 330, 335, and/or 340 before repeating the check of step 325. After performing the size alignment procedure, the UE ensures that the DCI size thresholds are satisfied, which enables the UE to successfully monitor for the configured DCIs.

As indicated above, FIGS. 3A and 3B are provided as examples. Other examples may differ from what is described with respect to FIGS. 3A and 3B.

Figure 4:
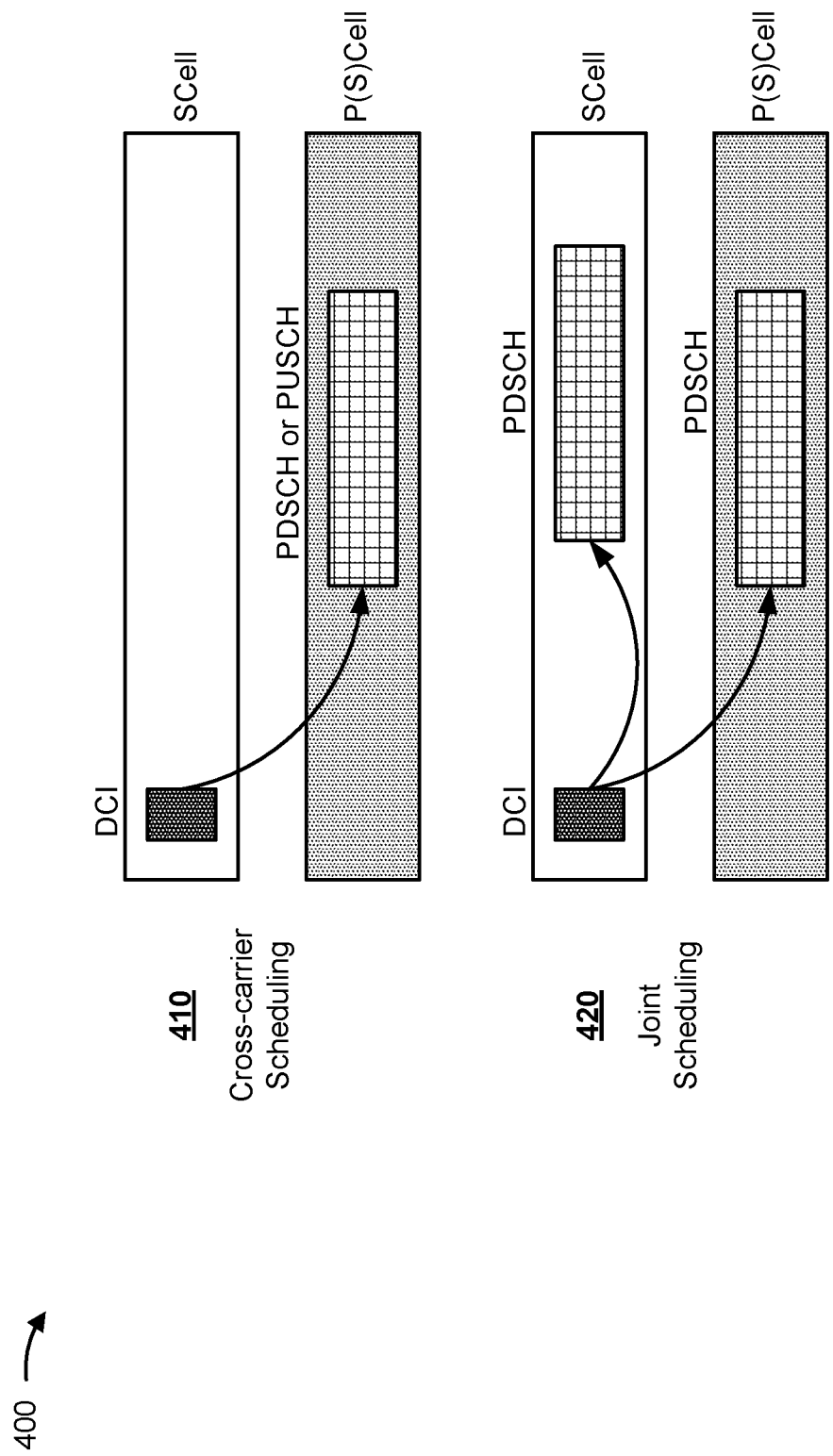
FIG. 4 is a diagram illustrating an example of cross-carrier scheduling, in accordance with the present disclosure.

FIG. 4 is a diagram illustrating an example 400 of cross-carrier scheduling, in accordance with the present disclosure. As shown in FIG. 4, example 400 may include a secondary cell (SCell), which is a non-dynamic spectrum sharing (DSS) carrier with a subcarrier spacing (SCS) of, for example, 15 kilohertz (kHz) or 30 kHz for communications between a BS and a UE, and a primary cell or primary secondary cell P(S)Cell, which is a DSS carrier with an SCS of, for example, 15 kHz for communications between the BS and the UE. In some cases, the SCell may be an NR-unlicensed spectrum (NR-U) carrier.

As shown in FIG. 4, and by reference number 410, a first example of cross-carrier scheduling may include the BS transmitting a DCI with a particular format on the SCell to schedule a physical downlink shared channel (PDSCH) communication or a physical uplink shared channel (PUSCH) communication on the P(S)Cell. As shown by reference number 420, a second example of cross-carrier scheduling may include the BS transmitting the DCI on the SCell to schedule a first PDSCH communication on the SCell and a second PDSCH on the P(S)Cell. The second example of cross-carrier scheduling may be a joint scheduling scenario (e.g., a scenario in which both cross-carrier scheduling and self-scheduling occur).

As indicated above, FIG. 4 is provided as an example. Other examples may differ from what is described with respect to FIG. 4.

In some communications systems, such as 5G, a channel may be divided into a plurality of carriers, which may also be termed "component carriers" or "CCs". For example, a secondary cell may include a first carrier and a second carrier, which may each be used for uplink and/or downlink communication. Similarly, a primary cell may have one or more carriers for uplink and/or downlink communication. In some cases, a component carrier, which may be a subdivision of a channel, may include multiple carriers, which may be subdivisions of the component carrier. In some cases, a cell (e.g., a serving cell) may have multiple carriers in multiple frequencies.

However, as described above, a UE may have one or more DCI size thresholds that are to be satisfied for a channel. If the UE were to attempt to monitor for more than a threshold quantity of DCI sizes, the UE may use excess processing resources, excess power resources, and/or the like. With a plurality of carriers in a cell, there may be additional DCI sizes that the UE may be configured to monitor for, but the aforementioned DCI size alignment procedures may not be applicable to multiple carrier (multi-carrier or multi-CC) scenarios. For example, multi-carrier scenarios may introduce a multi-carrier DCI that may be associated with a different DCI size than other DCI formats, such as DCIs 0_0/1_0, 0_2/1_2, and/or the like.

Some aspects described herein provide for DCI size alignment in multi-carrier scenarios. For example, a UE may determine whether a DCI size threshold is satisfied for each scheduled cell and may perform DCI size alignment on different DCI formats, a multi-carrier DCI, and/or the like. In this way, the UE may ensure that a quantity of DCI sizes of DCI formats for which the UE is configured to monitor does not exceed the DCI size threshold, thereby avoiding excessive use of processing resources, excessive use of power resources, and/or the like.

Figure 5A:
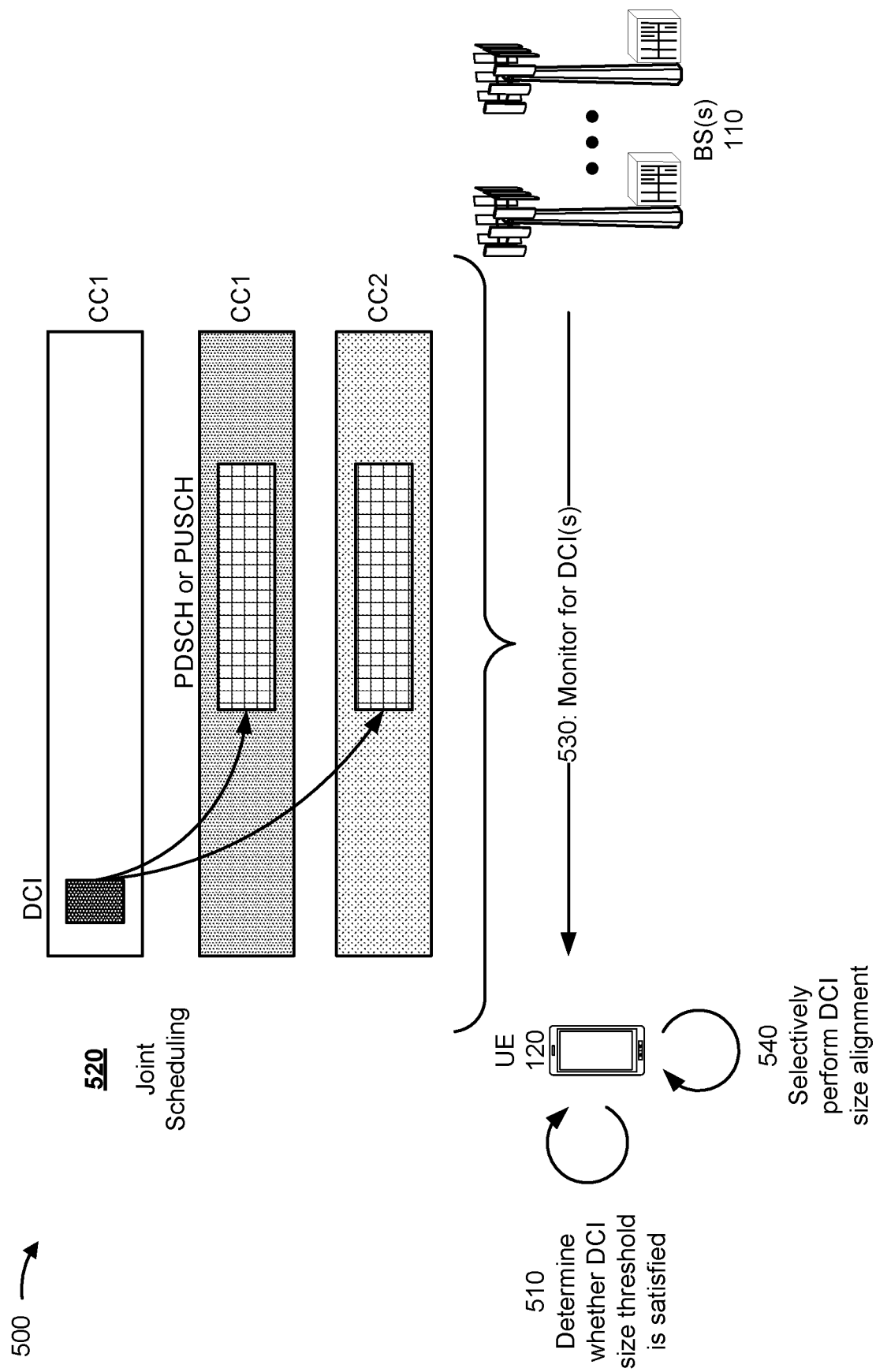
FIGS. 5A and 5B are diagrams illustrating examples associated with DCI size configuration for multiple carrier scheduling scenarios, in accordance with the present disclosure.
Figure 5B:
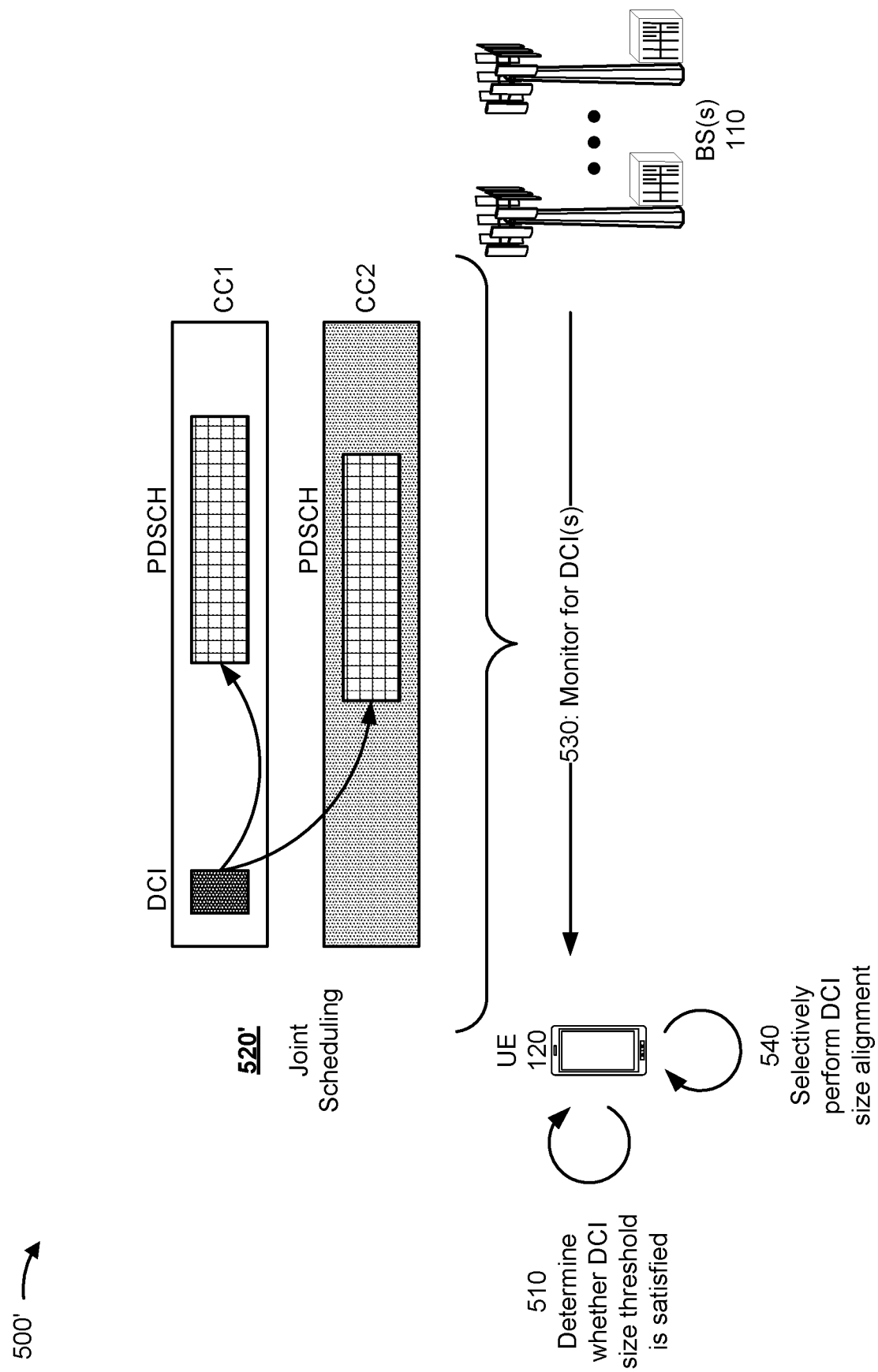

FIGS. 5A and 5B are diagrams illustrating examples 500/500' associated with DCI size configuration multi-carrier scheduling scenarios, in accordance with the present disclosure. As shown in FIGS. 5A and 5B, examples 500/500' include communication between one or more BSs 110 and a UE 120. In some aspects, the one or more BSs 110 and UE 120 may be included in a wireless network, such as wireless network 100. The one or more BSs 110 and UE 120 may communicate on a wireless access link, which may include an uplink and a downlink.

As further shown in FIG. 5A, and by reference number 510, UE 120 may determine whether a DCI size threshold is satisfied. In some aspects, UE 120 may determine whether the DCI size threshold is satisfied for each scheduled cell. For example, for a set of two scheduled cells corresponding to two carriers (e.g., carriers (CCs), CC1 and CC2, as shown by reference number 520 in FIG. 5A and by reference number 520' in FIG. 5B), UE 120 may determine whether a first DCI size of DCIs (including a multi-carrier DCI) that UE 120 is to monitor for a first scheduled cell satisfies the threshold and/or whether a second DCI size of DCIs that UE 120 is to monitor for a second scheduled cell satisfies the threshold. In this case, based at least in part on either the first DCI size satisfying the threshold or the second DCI size satisfying the threshold, UE 120 may trigger a DCI size alignment procedure, as described herein.

Additionally, or alternatively, UE 120 may determine whether the DCI size threshold is satisfied for each scheduling cell for each scheduled cell. For example, UE 120 may determine whether the DCI size threshold is satisfied for the scheduling cell (e.g., CC1) that schedules the scheduled cells (e.g., CC1 and CC2). In this case, when a scheduling cell schedules a plurality of scheduled cells associated with a plurality of carriers, a DCI size threshold for the scheduling cell is the same as when the scheduling cell is scheduling a single carrier. Additionally, or alternatively, the DCI size threshold may be a multiple of a quantity of scheduled cells. For example, when there are two scheduled cells, as shown, the DCI size threshold may be two times the DCI size threshold as for when there is one scheduled cell. In this case, when the DCI threshold is 4 DCI sizes and 3 DCI sizes for DCIs with C-RNTIs for a single scheduled cell, as described above, UE 120 may determine whether a DCI size exceeds a threshold of 8 DCI sizes and 6 DCI sizes for DCIs with C-RNTIs when there are two scheduled cells.

In some aspects, UE 120 may determine the DCI size thresholds separately. For example, UE 120 may determine a DCI size threshold for carrier 1 (e.g., 4 DCIs and 3 DCIs with a C-RNTI), a DCI size threshold for carrier 2 (e.g., 4 DCIs and 3 DCIs with a C-RNTI), and/or the like. In this case, UE 120 may separately determine whether to perform size alignment on one or more DCIs (e.g., including a multi-carrier DCI). For example, UE 120 may determine that the DCI size threshold is only exceeded for carrier 1, and may perform DCI size alignment only for DCIs scheduling for carrier 1. In contrast, in some aspects, UE 120 may determine the DCI size thresholds jointly. For example, UE 120 may determine a single DCI size threshold for carriers 1 and 2 (e.g., 4 DCIs and 3 DCIs with a C-RNTI). In this case, UE 120 may determine to perform size alignment on DCIs scheduling for both carrier 1 and 2 when the single DCI size threshold is exceeded.

In some aspects, UE 120 may use carrier aggregation techniques to increase a DCI size threshold. For example, when UE 120 supports carrier aggregation for a quantity, N, of downlink carriers, UE 120 may determine the size threshold as a multiple of N (e.g., N×4 DCIs, N×3 DCIs with a C-RNTI). In this case, when UE 120 is monitoring for a DCI, UE 120 may use processing capabilities reserved for another quantity M of carriers configured for multi-carrier scheduling. In this case, UE 120 may be configured with carrier aggregation of up to N–M downlink carriers.

As further shown in FIG. 5A, and by reference number 530, UE 120 may selectively perform DCI size alignment. For example, UE 120 may perform DCI size alignment on a downlink DCI for multi-carrier scheduling or an uplink DCI for multi-carrier scheduling, as described in more detail with regard to FIGS. 6A and 6B. In some aspects, UE 120 may perform DCI size alignment on a multi-carrier DCI. For example, UE 120 may be configured with the DCI size alignment procedure of FIGS. 3A and 3B, but with alignment actions for DCIs 0_2 and 1_2 replaced with a downlink DCI for multi-carrier scheduling and an uplink DCI for multi-carrier scheduling, respectively. In this case, rather than aligning DCIs 0_2 and 1_2 to the same size (e.g., Size E or Size F), UE 120 may align the downlink DCI for multi-carrier scheduling and the uplink DCI for multi-carrier scheduling to the same size (e.g., Size E or Size F). In this case, UE 120 may not be able to monitor DCIs 0_0/0_1, 0_1/1_0, 0_2/1_2, and the downlink and uplink DCIs for multi-carrier scheduling because DCIs 0_0/0_1, 0_1/1_0, and 0_2/1_2 already satisfy the requirement of having no more than 3 DCIs with a C-RNTI configured (but adding a multi-carrier DCI would exceed the requirement). As a result, in this case, base station 110 may configure UE 120, using radio resource control (RRC) signaling, to avoid a configuration that includes monitoring of DCIs 0_0/0_1, 0_1/1_0, 0_2/1_2, and the downlink and uplink DCIs for multi-carrier scheduling for the same scheduled cell.

Additionally, or alternatively, UE 120 may align the downlink and uplink DCIs for multi-carrier scheduling by performing additional alignment actions added to the DCI alignment procedure described with regard to FIGS. 3A and 3B. For example, as described in more detail herein, UE 120 may add alignment actions to append bits to at least one of DCIs 0_0/0_1; 0_1/1_0; or the uplink or downlink DCI for multi-carrier scheduling to cause two of DCIs 0_0/0_1; 0_1/1_0; or the uplink or downlink DCI for multi-carrier scheduling to have the same DCI size.

As further shown in FIG. 5A, and by reference number 540, UE 120 may monitor for a set of DCIs. For example, UE 120 may monitor CC1 for a DCI scheduling a PDSCH or PUSCH in CC1 and CC2.

As indicated above, FIGS. 5A and 5B are provided as examples. Other examples may differ from what is described with respect to FIGS. 5A and 5B.

Figure 6B:
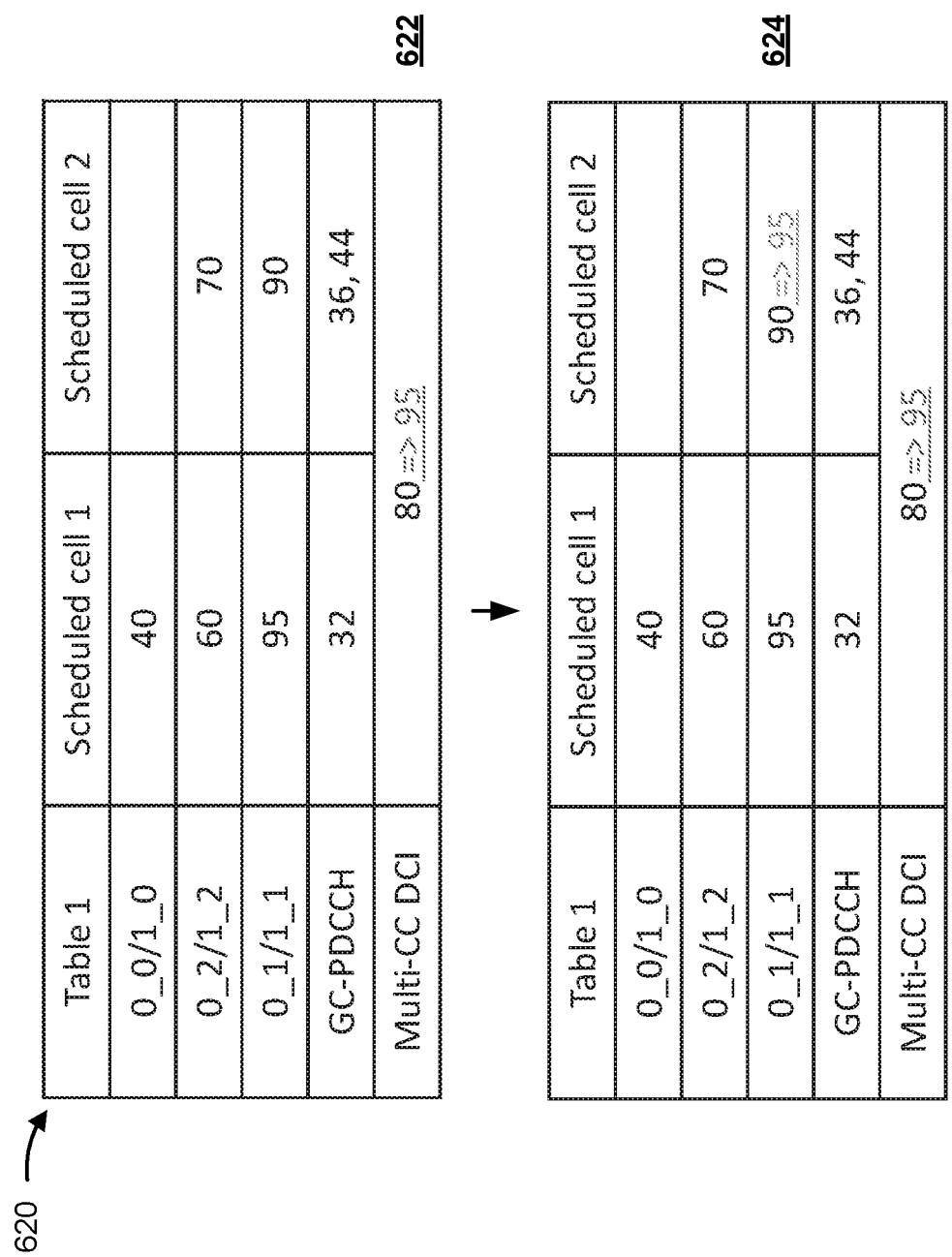

FIGS. 6A and 6B are diagrams illustrating examples 600-620 associated with DCI size configuration multi-carrier scheduling scenarios, in accordance with the present disclosure.

As shown in FIG. 6A, and by example 600, UE 120 may be configured to monitor DCIs for a first scheduled cell and a second scheduled cell. For example, UE 120 may be configured to monitor DCIs 0_0/1_0, 0_2/1_2, 0_1/1_1, a group-common (GC) physical downlink control channel (PDCCH), and/or a multi-carrier DCI. In this case, after performing step 340 of FIG. 3B, UE 120 may determine whether a DCI size for the multi-carrier DCI is larger than a size of DCIs 0_1/1_1 and, if so, append bits to DCIs 0_1/1_1 to align a size of DCIs 0_1/1_1 to a size of the multi-carrier DCI. In contrast, as shown in example 610, if a DCI size for the multi-carrier DCI is smaller than a size of DCIs 0_1/1_1, UE 120 may append bits to the multi-carrier DCI to align a size of the multi-carrier DCI to a size of DCIs 0_1/1_1. In some aspects, rather than performing an alignment action for the multi-carrier DCI after step 340, UE 120 may perform an alignment action for the multi-carrier DCI before step 340. In this case, rather than aligning the multi-carrier DCI to DCIs 0_1/1_1, as described above, UE 120 may align the multi-carrier DCI to DCIs 0_2/1_2 (e.g., by appending bits to DCIs 0_2/1_2 or to the multi-carrier DCI to achieve size alignment).

As shown in FIG. 6B, and by example 620, UE 120 may perform multiple alignment actions to achieve size alignment when UE 120 is configured to monitor for a multi-carrier DCI. For example, after performing step 340 of FIG. 3B, UE 120 may, as shown by reference number 622, add padding bits to the multi-carrier DCI to align the multi-carrier DCI to DCI 0_1/1_1 for the first scheduled cell. However, in this case, DCI 0_1/1_1 has a first size for the first scheduled cell and a second size for the second scheduled cell, so a quantity of DCI sizes still exceeds a threshold. In this case, UE 120 may, as shown by reference number 624, add padding bits to DCI 0_1/1_1 for the second scheduled cell to align DCI 0_1/1_1 to the multi-carrier DCI.

As indicated above, FIGS. 6A and 6B are provided as examples. Other examples may differ from what is described with respect to FIGS. 6A and 6B.

Figure 7:
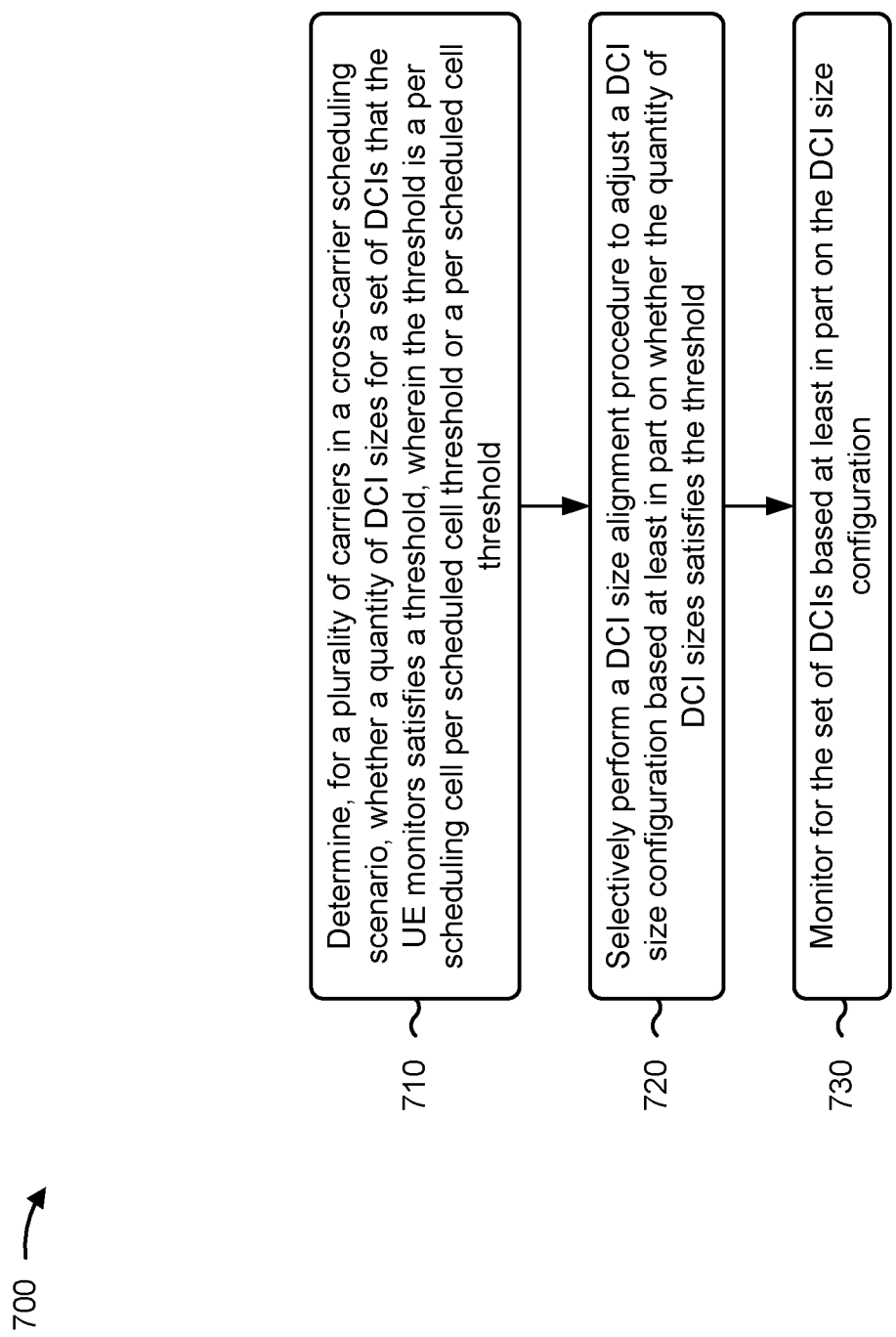
FIG. 7 is a diagram illustrating an example process associated with DCI size configuration for multiple carrier scheduling scenarios, in accordance with the present disclosure.

FIG. 7 is a diagram illustrating an example process 700 performed, for example, by a UE, in accordance with the present disclosure. Example process 700 is an example where the UE (e.g., UE 120) performs operations associated with DCI size configuration for multi-carrier scheduling scenarios.

As shown in FIG. 7, in some aspects, process 700 may include determining, for a plurality of carriers in a cross-carrier scheduling scenario, whether a quantity of DCI sizes for a set of DCIs that the UE monitors satisfies a threshold, wherein the threshold is a per scheduling cell per scheduled cell threshold or a per scheduled cell threshold (block 710). For example, the UE (e.g., using antenna 252, demodulator 254, MIMO detector 256, receive processor 258, transmit processor 264, TX MIMO processor 266, modulator 254, controller/processor 280, and/or memory 282) may determine, for a plurality of carriers in a cross-carrier scheduling scenario, whether a quantity of DCI sizes for a set of DCIs that the UE monitors satisfies a threshold, as described above. In some aspects, the threshold is a per scheduling cell per scheduled cell threshold or a per scheduled cell threshold. For example, the threshold may be evaluated for each scheduled cell (a per scheduled cell threshold) or may be evaluated for each scheduling cell of each scheduled cell (a per scheduling cell per scheduled cell threshold). As of a threshold example, (3+4 DCI budgets) (e.g., 3 DCI sizes for 4 different DCIs) may be a limit of a scheduling cell for a group of scheduled cells. As another example of a threshold, Y×(3+4 DCI budgets) may be a limit of a scheduling cell for scheduled cells where Y is a quantity of scheduled cells.

As further shown in FIG. 7, in some aspects, process 700 may include selectively performing a DCI size alignment procedure to adjust a DCI size configuration based at least in part on whether the quantity of DCI sizes satisfies the threshold (block 720). For example, the UE (e.g., using antenna 252, demodulator 254, MIMO detector 256, receive processor 258, transmit processor 264, TX MIMO processor 266, modulator 254, controller/processor 280, and/or memory 282) may selectively perform a DCI size alignment procedure to adjust a DCI size configuration based at least in part on whether the quantity of DCI sizes satisfies the threshold, as described above.

As further shown in FIG. 7, in some aspects, process 700 may include monitoring for the set of DCIs based at least in part on the DCI size configuration (block 730). For example, the UE (e.g., using antenna 252, demodulator 254, MIMO detector 256, receive processor 258, transmit processor 264, TX MIMO processor 266, modulator 254, controller/processor 280, and/or memory 282) may monitor for the set of DCIs based at least in part on the DCI size configuration, as described above.

Process 700 may include additional aspects, such as any single aspect or any combination of aspects described below and/or in connection with one or more other processes described elsewhere herein.

In a first aspect, the threshold is the per scheduled cell threshold.

In a second aspect, alone or in combination with the first aspect, selectively performing the DCI size alignment procedure comprises adding one or more padding bits to a DCI, of the set of DCIs, that is a downlink DCI for multiple carrier scheduling or that is an uplink DCI for multiple carrier scheduling.

In a third aspect, alone or in combination with one or more of the first and second aspects, process 700 includes receiving radio resource control signaling that configures monitoring for the set of DCIs in accordance with the adding the one or more padding bits.

In a fourth aspect, alone or in combination with one or more of the first through third aspects, selectively performing the DCI size alignment procedure comprises adding one or more padding bits to a first DCI of the set of DCIs to cause the first DCI and a second DCI to have a common size.

In a fifth aspect, alone or in combination with one or more of the first through fourth aspects, a quantity of the one or more padding bits is based at least in part on a cell for which one or more DCIs, of the set of DCIs, fill a DCI size budget associated with the threshold.

In a sixth aspect, alone or in combination with one or more of the first through fifth aspects, monitoring for the set of DCIs comprises receiving a first DCI with a first format and with a particular size, receiving a second DCI with a second format and the particular size, and distinguishing between the first format and the second format based at least in part on at least one of respective search spaces, respective control resource sets, or respective monitoring occasions.

In a seventh aspect, alone or in combination with one or more of the first through sixth aspects, the threshold is the per scheduling cell per scheduled cell threshold.

In an eighth aspect, alone or in combination with one or more of the first through seventh aspects, a size of the threshold is based at least in part on a quantity of scheduled cells.

In a ninth aspect, alone or in combination with one or more of the first through eighth aspects, the threshold includes at least one of a first threshold for a first one or more DCIs, of the set of DCIs, scheduling for a first carrier, a second threshold for a second one or more DCIs, of the set of DCIs, scheduling for a second carrier, or a third threshold for a third one or more DCIs, of the set of DCIs, jointly scheduling for the first carrier and the second carrier.

In a tenth aspect, alone or in combination with one or more of the first through ninth aspects, a size of the threshold is based at least in part on the set of DCIs including a multiple carrier scheduling DCI.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
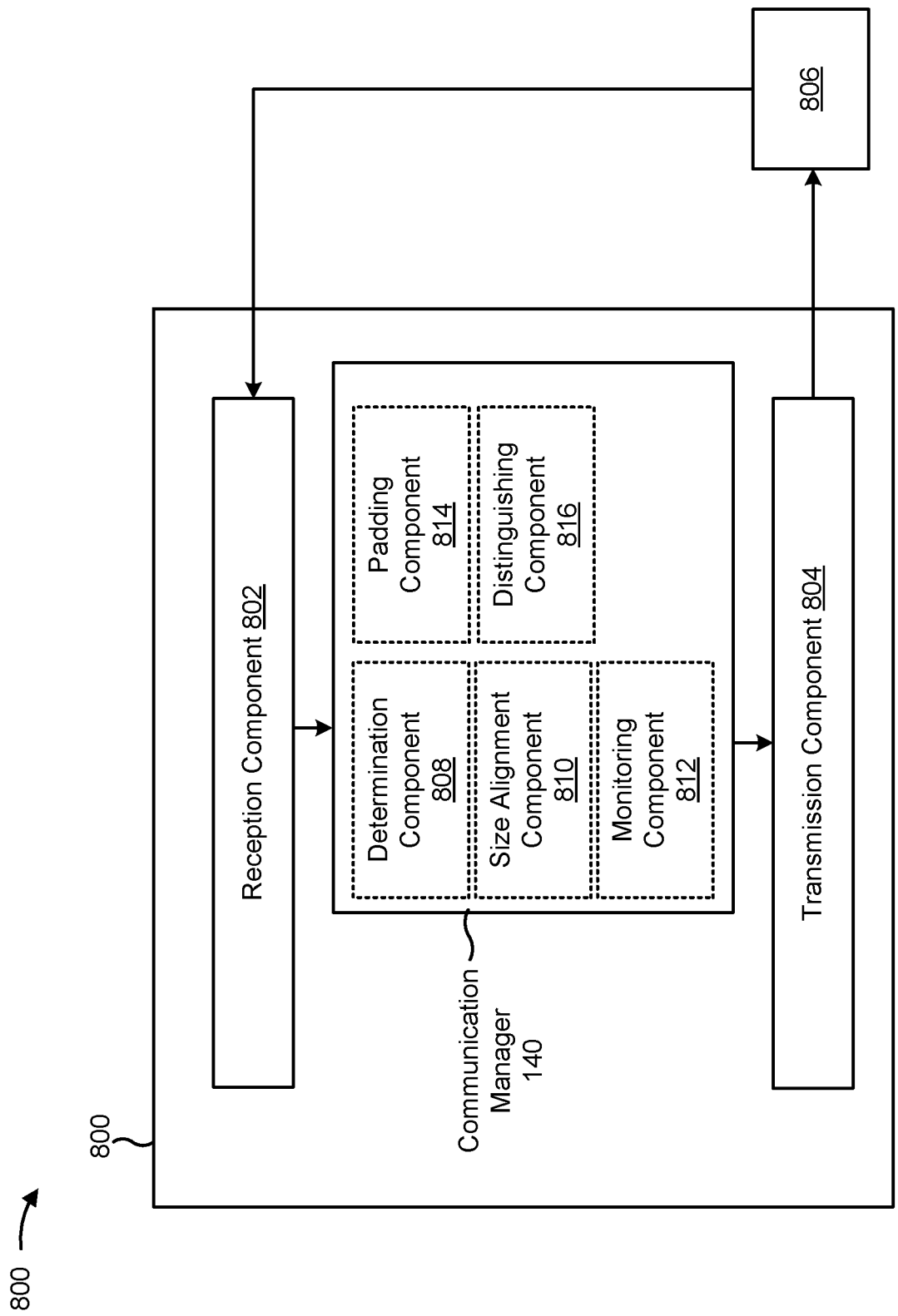
FIG. 8 is a diagram of an example apparatus for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of a determination component 808, a size alignment component 810, a monitoring component 812, a padding component 814, or a distinguishing component 816, among other examples.

In some aspects, the apparatus 800 may be configured to perform one or more operations described herein in connection with FIG. 5A-6B. Additionally, or alternatively, the apparatus 800 may be configured to perform one or more processes described herein, such as process 700 of FIG. 7. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The determination component 808 may determine, for a plurality of carriers in a cross-carrier scheduling scenario, whether a quantity of DCI sizes for a set of DCIs, that the apparatus 800 monitors, satisfies a threshold. The size alignment component 810 may selectively perform a DCI size alignment procedure to adjust a DCI size configuration based at least in part on whether the quantity of DCI sizes satisfies the threshold. The monitoring component 812 may monitor for the set of DCIs based at least in part on the DCI size configuration.

The padding component 814 may add one or more padding bits to a DCI, of the set of DCIs, that is a downlink DCI for multiple carrier scheduling or that is an uplink DCI for multiple carrier scheduling. The reception component 802 may receive radio resource control signaling that configures monitoring for the set of DCIs in accordance with the adding the one or more padding bits. The padding component 814 may add one or more padding bits to a first DCI of the set of DCIs to cause the first DCI and a second DCI to have a common size.

The reception component 802 may receive a first DCI with a first format and with a particular size. The reception component 802 may receive a second DCI with a second format and the particular size. The distinguishing component 816 may distinguish between the first format and the second format based at least in part on at least one of: respective search spaces, respective control resource sets, or respective monitoring occasions.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: determining, for a plurality of carriers in a cross-carrier scheduling scenario, whether a quantity of downlink control information (DCI) sizes for a set of DCIs, that the UE monitors, satisfies a threshold, wherein the threshold is a per scheduling cell per scheduled cell threshold or a per scheduled cell threshold; selectively performing a DCI size alignment procedure to adjust a DCI size configuration based at least in part on whether the quantity of DCI sizes satisfies the threshold; and monitoring for the set of DCIs based at least in part on the DCI size configuration.

Aspect 2: The method of Aspect 1, wherein the threshold is the per scheduled cell threshold.

Aspect 3: The method of any of Aspects 1 to 2, wherein selectively performing the DCI size alignment procedure comprises: adding one or more padding bits to a DCI, of the set of DCIs, that is a downlink DCI for multiple carrier scheduling or that is an uplink DCI for multiple carrier scheduling.

Aspect 4: The method of any of Aspect 3, further comprising: receiving radio resource control signaling that configures monitoring for the set of DCIs in accordance with the adding the one or more padding bits.

Aspect 5: The method of any of Aspects 1 to 4, wherein selectively performing the DCI size alignment procedure comprises: adding one or more padding bits to a first DCI of the set of DCIs to cause the first DCI and a second DCI to have a common size.

Aspect 6: The method of Aspect 5 wherein a quantity of the one or more padding bits is based at least in part on a cell for which one or more DCIs, of the set of DCIs, fill a DCI size budget associated with the threshold.

Aspect 7: The method of any of Aspects 1 to 6, wherein monitoring for the set of DCIs comprises: receiving a first DCI with a first format and with a particular size; receiving a second DCI with a second format and the particular size; and distinguishing between the first format and the second format based at least in part on at least one of: respective search spaces, respective control resource sets, or respective monitoring occasions.

Aspect 8: The method of any of Aspects 1 to 7, wherein the threshold is the per scheduling cell per scheduled cell threshold.

Aspect 9: The method of any of Aspects 1 to 8, wherein a size of the threshold is based at least in part on a quantity of scheduled cells.

Aspect 10: The method of any of Aspects 1 to 9, wherein the threshold includes at least one of a first threshold for a first one or more DCIs, of the set of DCIs, scheduling for a first carrier; a second threshold for a second one or more DCIs, of the set of DCIs, scheduling for a second carrier; or a third threshold for a third one or more DCIs, of the set of DCIs, jointly scheduling for the first carrier and the second carrier.

Aspect 11: An apparatus for wireless communication at a device, comprising a processor; memory coupled with the processor; and instructions stored in the memory and executable by the processor to cause the apparatus to perform the method of one or more of Aspects 1-10.

Aspect 12: A device for wireless communication, comprising a memory and one or more processors coupled to the memory, the one or more processors configured to perform the method of one or more of Aspects 1-10.

Aspect 13: An apparatus for wireless communication, comprising at least one means for performing the method of one or more of Aspects 1-10.

Aspect 14: A non-transitory computer-readable medium storing code for wireless communication, the code comprising instructions executable by a processor to perform the method of one or more of Aspects 1-10.

Aspect 15: A non-transitory computer-readable medium storing a set of instructions for wireless communication, the set of instructions comprising one or more instructions that, when executed by one or more processors of a device, cause the device to perform the method of one or more of Aspects 1-10.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:
1. A user equipment (UE) for wireless communication, comprising:
one or more memories; and
one or more processors, coupled to the one or more memories, configured to:

determine whether a quantity of downlink control information (DCI) sizes for a set of DCI communications, that the UE is configured to monitor, satisfies a threshold,
  wherein the threshold is a per scheduled cell threshold;
selectively perform a DCI size alignment procedure to adjust a DCI size configuration based at least in part on whether the quantity of DCI sizes satisfies the threshold,
  wherein the one or more processors, to perform the DCI size alignment procedure, are configured to:
    add one or more padding bits to a first DCI of the set of DCI communications to cause the first DCI and a second DCI to have a common size; and
monitor for the set of DCI communications based at least in part on the DCI size configuration.

2. The UE of claim 1, wherein the one or more processors, to selectively perform the DCI size alignment procedure, are configured to:
add one or more padding bits to a third DCI, of the set of DCI communications, that is a downlink DCI for multiple carrier scheduling or that is an uplink DCI for multiple carrier scheduling.

3. The UE of claim 2, wherein the one or more processors are further configured to:
receive radio resource control signaling that configures monitoring for the set of DCI communications in accordance with the adding of the one or more padding bits to the third DCI.

4. The UE of claim 1, wherein a quantity of the one or more padding bits is based at least in part on a cell for which one or more DCI communications, of the set of DCI communications, fill a DCI size budget associated with the threshold.

5. The UE of claim 1, wherein the one or more processors, to monitor for the set of DCI communications, are configured to:
receive the first DCI, the first DCI having a first format and a particular size;
receive the second DCI, the second DCI having a second format and the particular size; and
distinguish between the first format and the second format based at least in part on at least one of: respective search spaces, respective control resource sets, or respective monitoring occasions.

6. The UE of claim 1, wherein a size of the threshold is a multiple of a quantity of scheduled cells.

7. The UE of claim 1, wherein the threshold includes at least one of a first threshold for a first one or more DCI communications, of the set of DCI communications, scheduling for a first carrier; a second threshold for a second one or more DCI communications, of the set of DCI communications, scheduling for a second carrier; or a third threshold for a third one or more DCI communications, of the set of DCI communications, jointly scheduling for the first carrier and the second carrier.

8. The UE of claim 1, wherein a size of the threshold is based at least in part on the set of DCI communications including a multiple carrier scheduling DCI.

9. The UE of claim 1, wherein the one or more processors are further configured to:
determine whether the quantity of DCI sizes satisfies another threshold,
  wherein the other threshold is a per scheduling cell per scheduled cell threshold; and
  selectively perform the DCI size alignment procedure based at least in part on whether the quantity of DCI sizes satisfies the other threshold.

10. The UE of claim 1, wherein the one or more processors, to determine whether the quantity of DCI sizes for the set of DCI communications satisfies the threshold, are configured to:
determine, for a plurality of carriers in a cross-carrier scheduling scenario, the quantity of DCI sizes for the set of DCI communications satisfies the threshold.

11. The UE of claim 1, wherein the one or more processors, to perform the DCI size alignment, are configured to:
perform the DCI size alignment in a multi-carrier scenario.

12. A method of wireless communication performed by a user equipment (UE), comprising:
determining whether a quantity of downlink control information (DCI) sizes for a set of DCI communications, that the UE monitors, satisfies a threshold,
  wherein the threshold is a per scheduled cell threshold;
selectively performing a DCI size alignment procedure to adjust a DCI size configuration based at least in part on whether the quantity of DCI sizes satisfies the threshold,
  wherein performing the DCI size alignment procedure comprises adding one or more padding bits to a first DCI of the set of DCI communications to cause the first DCI and a second DCI to have a common size; and
monitoring for the set of DCI communications based at least in part on the DCI size configuration.

13. The method of claim 12, wherein selectively performing the DCI size alignment procedure comprises:
adding one or more padding bits to a third DCI, of the set of DCI communications, that is a downlink DCI for multiple carrier scheduling or that is an uplink DCI for multiple carrier scheduling.

14. The method of claim 13, further comprising:
receiving radio resource control signaling that configures monitoring for the set of DCI communications in accordance with the adding the one or more padding bits.

15. The method of claim 12, wherein a quantity of the one or more padding bits is based at least in part on a cell for which one or more DCI communications, of the set of DCI communications, fill a DCI size budget associated with the threshold.

16. The method of claim 12, wherein monitoring for the set of DCIs comprises:
receiving the first DCI, the first DCI having a first format and a particular size;
receiving the second DCI, the second DCI having a second format and the particular size; and
distinguishing between the first format and the second format based at least in part on at least one of: respective search spaces, respective control resource sets, or respective monitoring occasions.

17. The method of claim 12, wherein a size of the threshold is a multiple of a quantity of scheduled cells.

18. The method of claim 12, wherein the threshold includes at least one of a first threshold for a first one or more DCI communications, of the set of DCI communications, scheduling for a first carrier; a second threshold for a second one or more DCI communications, of the set of DCI communications, scheduling for a second carrier; or a third threshold for a third one or more DCI communications, of the set of DCI communications, jointly scheduling for the first carrier and the second carrier.

19. The method of claim 12, wherein a size of the threshold is based at least in part on the set of DCI communications including a multiple carrier scheduling DCI.

20. A non-transitory computer-readable medium storing a set of instructions for wireless communication, the set of instructions comprising:
   one or more instructions that, when executed by one or more processors of a user equipment (UE), cause the UE to:
      determine whether a quantity of downlink control information (DCI) sizes for a set of DCI communications, that the UE monitors, satisfies a threshold, wherein the threshold is a per scheduled cell threshold;
      selectively perform a DCI size alignment procedure to adjust a DCI size configuration based at least in part on whether the quantity of DCI sizes satisfies the threshold,
         wherein the one or more instructions, that cause the UE to perform the DCI size alignment procedure, cause the UE to:
            add one or more padding bits to a first DCI of the set of DCI communications to cause the first DCI and a second DCI to have a common size; and
      monitor for the set of DCI communications based at least in part on the DCI size configuration.

21. The non-transitory computer-readable medium of claim 20, wherein the one or more instructions, that cause the UE to selectively perform the DCI size alignment procedure, cause the UE to:
   add one or more padding bits to a third DCI, of the set of DCI communications, that is a downlink DCI for multiple carrier scheduling or that is an uplink DCI for multiple carrier scheduling.

22. The non-transitory computer-readable medium of claim 21, wherein the one or more instructions further cause the UE to:
   receive radio resource control signaling that configures monitoring for the set of DCI communications in accordance with the adding of the one or more padding bits to the third DCI.

23. The non-transitory computer-readable medium of claim 20, wherein a quantity of the one or more padding bits is based at least in part on a cell for which one or more DCI communications, of the set of DCI communications, fill a DCI size budget associated with the threshold.

24. The non-transitory computer-readable medium of claim 20, wherein the one or more instructions, that cause the UE to monitor for the set of DCI communications, cause the UE to:
   receive the first DCI, the first DCI having a first format and a particular size;
   receive the second DCI, the second DCI having a second format and the particular size; and
   distinguish between the first format and the second format based at least in part on at least one of: respective search spaces, respective control resource sets, or respective monitoring occasions.

25. The non-transitory computer-readable medium of claim 20, wherein a size of the threshold is a multiple of a quantity of the scheduled cells.

26. The non-transitory computer-readable medium of claim 20, wherein the threshold includes at least one of a first threshold for a first one or more DCI communications, of the set of DCI communications, scheduling for a first carrier; a second threshold for a second one or more DCI communications, of the set of DCI communications, scheduling for a second carrier; or a third threshold for a third one or more DCI communications, of the set of DCI communications, jointly scheduling for the first carrier and the second carrier.

27. The non-transitory computer-readable medium of claim 20, wherein a size of the threshold is based at least in part on the set of DCI communications including a multiple carrier scheduling DCI.

28. An apparatus for wireless communication, comprising:
   means for determining whether a quantity of downlink control information (DCI) sizes for a set of DCI communications, that the apparatus monitors, satisfies a threshold,
      wherein the threshold is a per scheduled cell threshold;
   means for selectively performing a DCI size alignment procedure to adjust a DCI size configuration based at least in part on whether the quantity of DCI sizes satisfies the threshold,
      wherein the means for selectively performing the DCI size alignment procedure comprises:
         means for adding one or more padding bits to a first DCI of the set of DCI communications to cause the first DCI and a second DCI to have a common size; and
   means for monitoring for the set of DCI communications based at least in part on the DCI size configuration.

29. The apparatus of claim 28, wherein a size of the threshold is a multiple of a quantity of scheduled cells.

30. The apparatus of claim 28, wherein a size of the threshold is based at least in part on the set of DCI communications including a multiple carrier scheduling DCI.

* * * * *